(12) United States Patent
Fellerman

(10) Patent No.: US 8,725,634 B2
(45) Date of Patent: May 13, 2014

(54) ELECTRONIC DEFERRED CHECK WRITING SYSTEM

(75) Inventor: Linden J. Fellerman, San Diego, CA (US)

(73) Assignee: Secure Payment Systems, Inc., San Diego, CA (US)

( * ) Notice: Subject to any disclaimer, the term of this patent is extended or adjusted under 35 U.S.C. 154(b) by 906 days.

(21) Appl. No.: 12/368,597

(22) Filed: Feb. 10, 2009

(65) Prior Publication Data
US 2010/0205090 A1 Aug. 12, 2010

(51) Int. Cl.
*G06Q 40/00* (2012.01)
(52) U.S. Cl.
USPC ............................................. 705/39; 705/45
(58) Field of Classification Search
USPC ................................................. 705/35, 39, 45
See application file for complete search history.

(56) References Cited

U.S. PATENT DOCUMENTS

| | | | |
|---|---|---|---|
| 6,644,546 B2 * | 11/2003 | George et al. ............... | 235/379 |
| 6,754,640 B2 | 6/2004 | Bozeman | |
| 2001/0001856 A1 | 5/2001 | Gould et al. | |
| 2004/0034583 A1 * | 2/2004 | Lanier et al. ................. | 705/35 |
| 2006/0015427 A1 * | 1/2006 | Friedman ...................... | 705/35 |
| 2006/0015428 A1 | 1/2006 | Friedman | |
| 2007/0214086 A1 * | 9/2007 | Homoki ........................ | 705/45 |
| 2007/0288382 A1 * | 12/2007 | Narayanan et al. .......... | 705/45 |

OTHER PUBLICATIONS

Canon USA, Inc. "Image Filing Solutions" 2007, Lake Success, New York.
Nacha—The Electronic Payments Association,"The Automated Clearing House (ACH) Network." 2003 Herndon, Virginia. www.nacha.org.
The Federal Reserve Board, "Check Clearing for the 21st Century Act." www.federalreserve.gov, Jan. 27, 2005.

\* cited by examiner

*Primary Examiner* — Eric T Wong
(74) *Attorney, Agent, or Firm* — Stetina Brunda Garred & Brucker

(57) ABSTRACT

A method and system for electronic deferred check processing is disclosed. A processing center receives an account identifier and a plurality of deferred payment amounts. The deferred payment amounts may be specified in a check, which can be digitized and electronically transmitted for further processing. The account identifier is correlated to a purchaser checking account. The deferred payment amounts are transferred to a merchant account in accordance with one of a plurality of predefined merchant transfer schedules, and each transfer may have a fee associated therewith that is deductable from the deferred payment amounts. The funds corresponding to the deferred payment amounts are also transferred from the purchaser checking account according to a predefined deduction schedule.

23 Claims, 6 Drawing Sheets

|  | 66 | 68 | 70 | 72 | 74 |
|---|---|---|---|---|---|
|  | ↓ | ↓ | ↓ | ↓ | ↓ |
|  | CHECK # | CHECK $ AMT | CHECK DATE | DEPOSIT DATE | APPROVAL |
| 1. | _____ | _____.__ | _____ | IMMEDIATE | _____ |
| 2. | _____ | _____.__ | _____ | _____ | _____ |
| 3. | _____ | _____.__ | _____ | _____ | _____ |
| 4. | _____ | _____.__ | _____ | _____ | _____ |
|  | TOTAL: | _____.__ |  |  |  |

PURCHASER PRINTED NAME _76_____

STREET ADDRESS _78_____

CITY _80_____ STATE _82___ ZIPCODE _84_____

SOCIAL SECURITY _86__ - ____ - _____ DOB _88_ / ____ / ____

HOME PHONE _90_ - ____ - _____ WORK PHONE _92_ - ____ - _____

EMPLOYER BUSINESS NAME _94_____ YEARS EMPLOYED _96___

FIG. 7a

MERCHANT BUSINESS NAME _98_____

MERCHANT SALESPERSON PRINTED NAME _100_____

MERCHANT SALESPERSON SIGNATURE _102_____

PURCHASER SIGNATURE _104_____

TODAY'S DATE _106_ / _____ / _____

FIG. 7b

PAYDAY SALE

MERCHANT STORE NAME
MERCHANT ADDRESS LINE 2
MERCHANT ADDRESS LINE 3
MERCHANT ADDRESS LINE 4
MERCHANT ADDRESS LINE 5

02/02/09                                                      2:30PM

TERMINAL    :    AAA02
BATCH #     :    000745231
ROUTING #   :    122000496
ACCT #      :    ******6501

| ITEM #      | $AMOUNT   | CHK # | APPROVAL # |
|-------------|-----------|-------|------------|
| 0315555555  | 1,000.99  | 99901 | OKAY C324  |
| 0315555557  | 100.99    | 99902 | OKAY C542  |
| 0315555562  | 100.99    | 99903 | OKAY C747  |
| 0315555565  | 100.99    | 99904 | OKAY C995  |

TOTAL AMOUNT:                                              $1,303.96

ALL ITEMS WILL BE ELECTRONICALLY PRESENTED EITHER IN THE FORM OF A CHECK IMAGE OR ACH DEBIT. THE FIRST ITEM WILL BE PRESENTED IMMEDIATELY, WHILE ALL SUBSEQUENT ITEMS WILL BE PRESENTED IN 30 DAY INTERVALS FROM TODAY.

MERCHANT FOOTER LINE 1
MERCHANT FOOTER LINE 2
MERCHANT FOOTER LINE 3
MERCHANT FOOTER LINE 4
MERCHANT FOOTER LINE 5

MERCHANT COPY

FIG. 8

ELECTRONIC DEFERRED CHECK WRITING SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to the processing of financial transactions. More particularly, the present invention relates to systems and methods for electronic deferred check writing.

2. Related Art

Fundamental to the functioning of the economy is the exchange of payment for goods and services. Throughout modern commercial history, payment has typically been rendered with money in the form of currency or cash such as bank notes and coins. Cash continues to be widely used, but it is oftentimes impractical for high-value transactions for a number of widely acknowledged reasons. Because only a small variety of denominations exists, and the most widely available maximum denomination is $100, the weight and bulk of a large amount of cash for such high-value transactions may render it prohibitive due to security and transportation issues. On the other hand, the utility of the rare high denomination currency is limited because of the relative ease with which it may be stolen or lost, as authentication and/or proof of ownership is not required at the time of use.

While being fundamentally based on the value of currency, conventional financial transactions involve the transfer of funds that do not require the physical exchange of cash. One common type of payment is by check, which is a negotiable instrument that instructs a financial institution to pay a specific amount of currency from a designated account of an account holder (or drawer) to a payee that is specified on the check. Typically, the payee deposits the check at his own financial institution that may not necessarily be the same as that of the drawer. The payee's financial institution then initiates a request to the drawer's financial institution for a transfer of the specified amount with the routing number and account number on the check while provisionally crediting the account of the payee. The check is cleared once the funds have been transferred from the payee's financial institution to the drawer's financial institution, with appropriate debits and credits being made to the accounts of the payee and drawer.

Due to the inherent delays of the check clearing process and risk allocations of the same, the payee may have some exposure to loss by accepting checks as payment. That is, the payee will ultimately be responsible for the amount of the check if it fails to clear to the extent that funds are withdrawn from the payee's account in the interim, or to the extent that the payee will be unable to recoup the value of the goods or services rendered in relation to such "bounced" check.

Conventionally, checks are processed over the Automated Clearing House (ACH) network instead of the physical processing thereof by the pertinent financial institutions. In general, an ACH transaction is initiated by a receiver that authorizes an originator to issue an ACH debit or credit to an account. The receiver is understood to be the payor, and the originator is the payee. The originator then issues the ACH debit or credit to an Originating Depository Financial Institution (ODFI), which then sends the ACH debit or credit to the ACH operator to be relayed to a Receiving Depository Financial Institution. The receiver's account and the originator's account are then issued a credit or debit. ACH is used to process a wide variety of transactions including direct deposit of payroll, Social Security benefits, etc., and direct debit of utility bills, mortgages, insurance premiums, rents, etc. In the context of checks, however, the presentation of the check constitutes the receiver's (check writer) authorization. The originator (payee) issues an ACH debit to the receiver in the specified amount to the bank designated by the check, and the transfer of funds proceeds as described above. Notwithstanding the substantial improvements over conventional check processing, ACH transactions may take two to three days to complete, and the risk of loss to the merchant remains the same. Since ACH is operated by the National Automated Clearing House Association (NACHA), the various participating ODFIs and RDFIs are subject to the rules and regulations thereof.

As an improvement over conventional check processing and an alternative to ACH, the United States Congress enacted the Check Clearing for the 21st Century Act, also known as Check 21, for facilitating the electronic processing of checks. Check 21 allows banks to capture an image of the front and back of the check in a process referred to as truncation. The captured check image data, which serves as a legal substitute for a physical copy of the check, is then exchanged between member banks, savings and loans, credit unions, servicers, clearinghouses, and the Federal Reserve banks for payment processing. In addition, due to the widespread availability of scanners and check reading devices, it is possible for merchants to deposit checks remotely without having to be physically delivered to the bank. Because the need for transporting checks is eliminated, efficiency gains and cost reductions can be achieved, and the financial system can remain operational even in emergencies that affect transportation infrastructure.

One problem with all check-related payment modalities is that, as a general matter, the payor account must have sufficient funds before payment is rendered. Under earlier paper check processing, there was a period of two to three days known as float during which the payor account was not debited, so it was possible for a payor to cut a check without sufficient funds at the time of presentment but immediately thereafter depositing funds sufficient to cover the check. Under Check 21, the check can be processed at the time of presentment, though most banks still honor a one-day float period. In any case, except for the limited circumstances noted, the entirety of the funds must be available at or around the time that the payment is made.

This is particularly problematic for large, unexpected, yet absolutely necessary expenses. For example, the widespread unavailability of affordable healthcare has left a substantial number of individuals to rely only upon emergency healthcare. Unfortunately, emergency healthcare is expensive, and oftentimes the very individuals that must resort to it are those least likely to have sufficient funds immediately available to cover the expenses. As another example, the expensive repair or replacement of automobiles may be necessary after involvement in a traffic accident. While insurance is intended to cover such expenses, those without sufficient means may opt for plans with higher deductibles because of an inability to pay higher premiums attendant with lower deductibles. Thus, there may be a significant amount that must be paid out-of-pocket, an amount that may not necessarily be available in full in a checking account. Even routine, expected, or planned expenses often exceed the amount available in a checking account.

Amongst other financial instruments for extending credit, credit cards are available to consumers for paying such large expenses. A financial institution such as a bank typically creates a new credit account and issues the credit card, which is part of a processing network such as VISA, MasterCard, American Express, Discover, and so forth. When the consumer makes a purchase from an approved member merchant, the credit account number and the amount of the purchase, along with other relevant information, are transmitted via the processing network to authorize the transaction. The customer repays the debt, typically on a monthly basis after the end of a billing cycle, while the linked account of the merchant is credited with the amount of the transaction once it is authorized. Credit cards offer flexibility because a balance can be carried that is repaid gradually over time, subject to the payment of interest. Furthermore, merchants are assured payment regardless of a customer's solvency.

As the extension of credit necessarily involves some risk, creditors employ various means to offset that risk and earn profits. These may make credit cards undesirable to one degree or another, and those with higher risk profiles are offered unfavorable terms such as usuriously high interest rates, membership and other fees, universal default provisions, and lower balance limits. For those deemed to be the highest risk, credit cards may simply be unavailable. Risk profiles are most commonly quantified in a credit score calculated from credit reports (from reporting agencies such as Experian, Equifax, and TransUnion) that include, for example, credit usage rate, repayment history, credit application frequency, income, and so forth.

Due to the recent credit crisis and for seemingly other reasons unconfirmed, even those previously deemed to be low credit risks in better economic times are now seeing adverse changes being made to existing credit card agreements. For example, one credit card company has raised interest rates by more than double for a substantial number of customers despite earlier explicit promises to the contrary. Another credit card company has lowered credit limits to the detriment of customers' debt utilization ratios and hence credit scores, which in turn triggered further interest rate increases. For these and numerous other abusive practices, customers are increasingly disfavoring credit cards, and those in less than ideal financial circumstances in particular are in need of different financing options.

One alternative to short-term financing with credit cards is a payment structure in which future dated checks are sequentially processed on the dates specified thereby, with representative examples being disclosed in U.S. Pat. App. Pub. No. 2006/0015428 and U.S. Pat. App. Pub. No. 2006/0015427, both to Friedman. In further detail, Friedman contemplates a check writer presenting one or more future-dated checks to a merchant, followed by a verification of the presenter's check writing history. Furthermore, the balance history of the presenter's account may also be evaluated to determine an appropriate monthly payment amount or total financing amount. If these verifications are acceptable, the merchant assigns all of the checks to a guarantee entity, and immediately receives the total amount for all of the checks presented, minus a service charge. The check guaranty entity then deposits the checks on the dates specified in each of the future-dated checks.

Although purchases can be financed much like with a credit card without the conventional disadvantages associated therewith, the future check financing methods of Friedman are, unfortunately, deficient in a number of significant regards. For example, risk to the guaranty entity may not be appropriately offset in the total amount paid to the merchant in light of the total amount financed and the periodic payment amounts. Furthermore, Friedman does not contemplate alternative risk-sharing balances between the merchant and the guaranty entity that are reflective of and accommodate market trends, nor any implementation specifics therefor. Accordingly, there is a need in the art for an improved electronic deferred check writing system and method.

BRIEF SUMMARY

In accordance with one embodiment of the present invention, a method for processing finance payments from a purchaser to a merchant in a transaction is contemplated. The method may begin with receiving images of a plurality of financial instruments. Each of the financial instruments may include a monetary value and at least one identifier associated with a financial account of the purchaser. The method may then continue with evaluating an approval status for the transaction based upon the account identifier on the financial instruments. Thereafter, the method may include transferring funds to the merchant. The funds may be transferred in response to the evaluation of the approval status. Additionally, the method may include the step of deducting funds from the financial account of the purchaser to the processor account at prescheduled intervals. An amount corresponding to the monetary value of a sequential one of the financial instruments may be deducted at each interval.

According to another embodiment of the present invention, a method for deferred check processing may begin with receiving at a processing center a purchaser account identifier and a plurality of deferred payment amounts. The purchaser account identifier may be correlated to a purchaser checking account. The method may further include transferring the deferred payment amounts to a merchant account in accordance with one of a plurality of predefined merchant transfer schedules. Additionally, the method may include deducting from the purchaser checking account funds corresponding to the deferred payment amounts according to a predefined deduction schedule.

In yet another embodiment of the present invention, an electronic deferred check payment issuance system is contemplated. The system may include a remote merchant terminal, and a check image scanner connected to the remote merchant terminal. The check image scanner may digitize a plurality of checks that each has an account identifier and a monetary value associated therewith. Furthermore, each of the checks may be tendered as partial payment for a single transaction between a merchant and a purchaser. The system may also include a central payment processor that is in communication with the remote merchant terminal. Additionally, the central payment processor may be in communication with a check clearing network to which a merchant account and a purchaser account designated by the account identifier on the check is also connected. The funds quantified by the monetary values of the checks may be deductible from the purchaser account and depositable to the merchant account by the central payment processor through the check clearing network. The deductions may proceed according to a set of schedules.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4b is a the back face of the exemplary check of FIG. 4a;

FIG. 6 is an exemplary check listing table transmitted to a central payment processor as part of completing the transaction;

FIGS. 7a and 7b are exemplary agreement forms also transmitted to a central payment processor as part of completing the transaction; and FIG. 8 is an exemplary receipt confirming the details of the transaction in accordance with an embodiment of the present invention.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
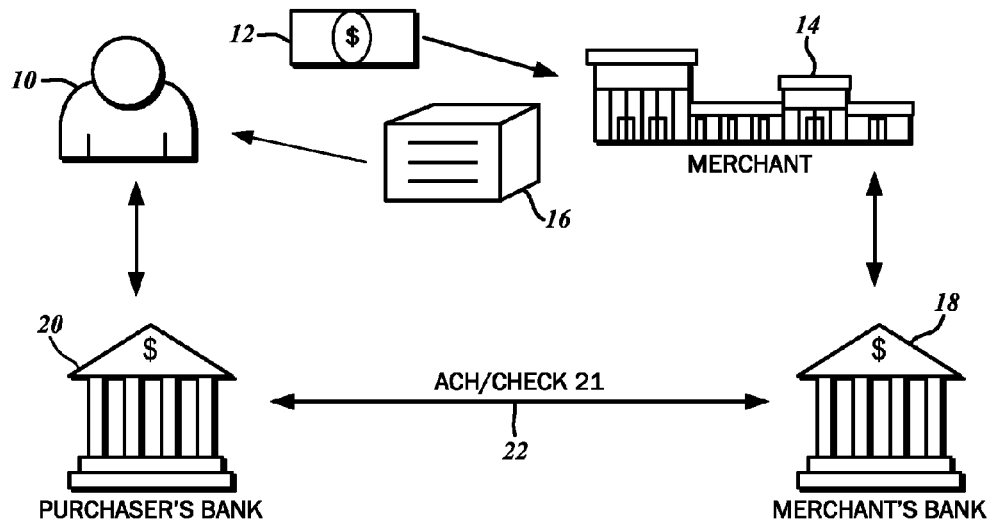
FIG. 1 is a block diagram of an exemplary environment within which the steps of a method for processing finance payments of a transaction in accordance with one embodiment of the present invention are performed, and depicts a merchant, a customer, and their respective banks.

Referring to the block diagram of FIG. 1, one common type of business transaction, a retail sale, typically involves a purchaser 10 rendering a payment 12 to a merchant 14 in exchange for goods or services 16 provided thereby. The present invention will be described in the context of this basic business transaction, which is provided by way of example only and not limitation. It is contemplated that the methods and systems of the present invention are particularly useful for the payment of expenses that may slightly exceed what a typical consumer has available in cash reserves in a given month that are saved in, for example, a checking account, but are unsuitable for long-term financing such as automobile loans and mortgages. Among such contemplated expenses include emergency home improvement/repair costs such as tile, floor and carpeting installation, appliance, furniture and bedding purchases, automotive repair and tire sales, and medical, dental and veterinary care. In one preferred embodiment, the type of suitable expenses are limited to such necessities, and exclude discretionary purchases such as audio/video equipment, jewelry, sporting goods, clothing, and so forth. Notwithstanding the foregoing, however, it will be appreciated by those having ordinary skill in the art that any other types of expenses or transactions involving any other additional parties besides the merchant 14 and the purchaser 10 may be readily substituted.

In the general retail sale above, the payment 12 may be by cash, credit card, check, or other widely used financial instrument, and the money may be deposited in a bank 18 having an account associated with the merchant 14, hereinafter referred to as the merchant's bank. If a check is presented as the payment 12, the merchant's bank 18 requests the transfer of funds from a bank 20 having an account associated with the purchaser 10, hereinafter referred to as the purchaser's bank. When referring to the merchant's bank 18 or the purchaser's bank 20, it will be understood that such terms also refer to the specific accounts held or managed by such banks that are associated with the merchant 14 and the purchaser 10, respectively. As described above, there are a number of ways in which a check can be processed through a check-clearing system 22 such as the ACH network or the Check 21 framework.

Figure 2:
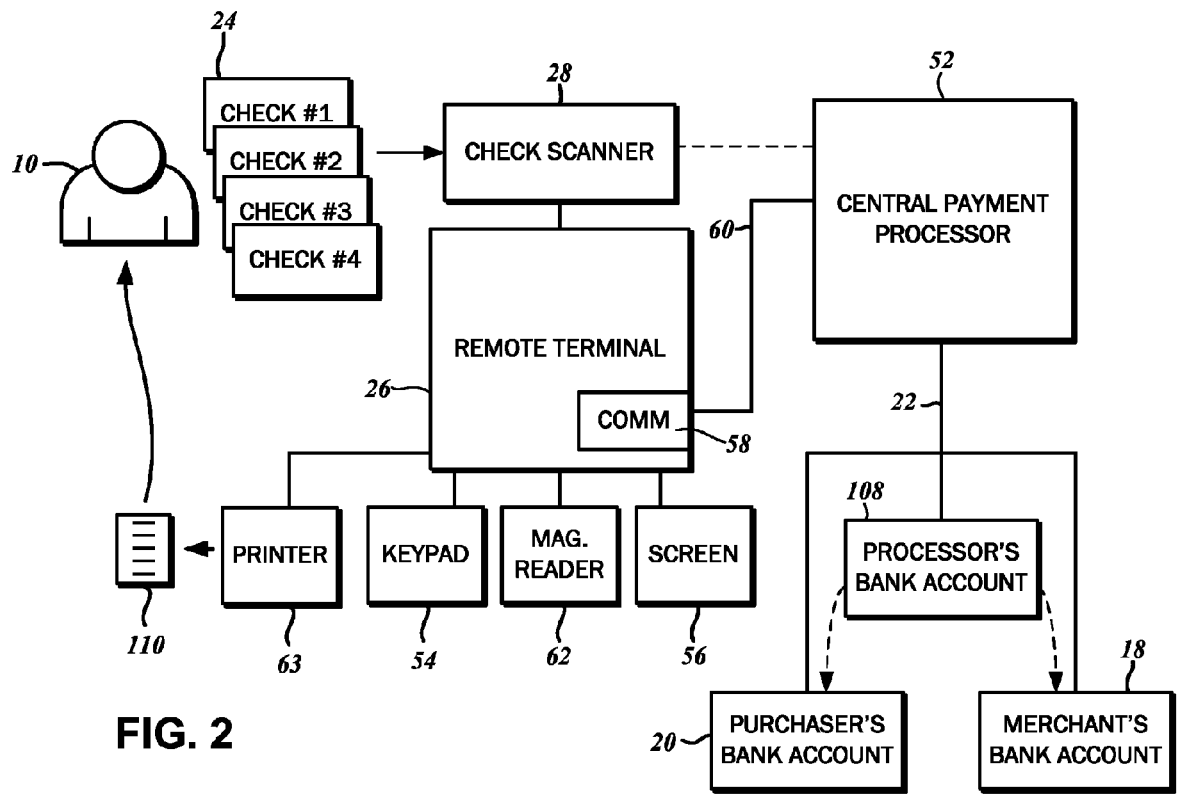
FIG. 2 is a block diagram of an electronic deferred check payment issuance system.

According to one embodiment of the present invention, a method for processing finance payments from the purchaser 10 to the merchant 14 is contemplated. As a variation to the above-described retail transaction, the payment 12 is split into smaller, more affordable amounts that are periodically debited from the purchaser 10 in such a manner that effectively extends short-term credit thereto. In the meantime, the purchaser 10 retains legal and physical ownership of the goods 16, and the services are performed at the time of the first payment. Referring to the detailed block diagram of FIG. 2 and the flowchart of FIG. 3, the method begins with a step 200 of receiving images of a plurality of checks 24 presented by the purchaser 10. Each of the checks 24 is understood to represent a fractional payment of the total amount for the transaction. As will be described more detail below, a preferred embodiment contemplates the acceptance of a maximum of four (4) checks that in total do not exceed $1,500, though this limit is presented by way of example only and not of limitation.

The merchant 14 may operate a remote terminal 26 that includes a check scanner 28 that is capable of capturing the images of the checks 24. In capturing the images, for example, a Tagged Image File Format (TIFF) file may be created. Any one of widely available check scanners 28 that can be controlled from the remote terminal 26 may be utilized, such as the EC5000 series and EC6000 series imagers from RDM Corporation of Waterloo, Ontario, Canada.

Figure 4A:
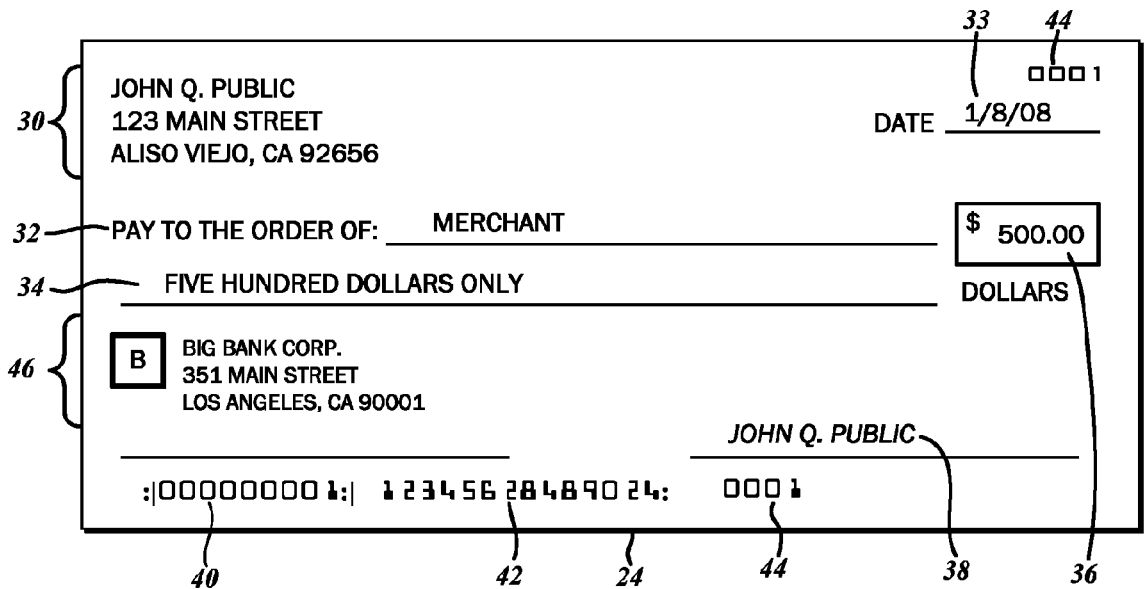
FIG. 4a is the front face of an exemplary check including various blocks of information that are presented by the customer to a merchant.
Figure 4B:
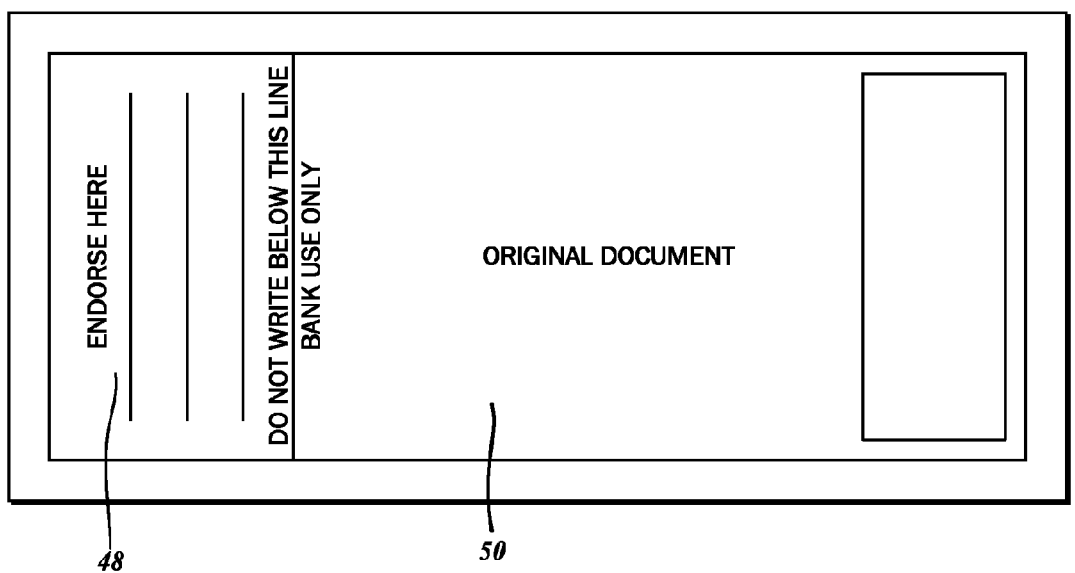

FIGS. 4a and 4b are representative examples of the front and back, respectively, of the check 24 and it is understood that the check scanner 28 produces data representative thereof for electronic transmission. Preferably, the format of the data produced by the check scanner 28 conforms to the X9.90 standard that sets forth the construction, layout, data elements, data content, and printing specifications for the truncated check 24.

In further detail, the checks 24 are understood to be financial instruments that instruct a bank or other financial institution to pay a specific amount of currency from a designated account of to a payee that is specified thereon. Referring to FIG. 4a, the front face of the check 24 includes a payor block 30 comprising the name and address of the payor or the purchaser 10. Immediately below the payor block 30 is a payee line 32, in which the payee, or the name of the merchant 14, is specified. There is also a date of issue field 33 to specify the date on which the check was cut. The check 24 also includes a payment amount line 34 in which the value is spelled out, as well as a payment amount block 36 in which the value is numerically indicated. For authenticating the payor as authorizing the payment specified on the check 24, there is a signature line 38.

As the funds specified must be drawn from a specific account at a specific bank associated with the purchaser 10, the check 24 includes a bank routing number 40 that is a nine-digit number in which the first four digits identifies the United States Federal Reserve Bank check processing center, and the next four digits identify the bank served thereby. The ninth digit is understood to be a checksum calculated from the previous eight digits. After the bank routing number 40, there is a unique account identifier 42 issued by the bank, and is associated with the purchaser 10. There may also be imprinted a check number 44 at various places on the check 24 for tracking purposes. It is understood that the bank routing number 40, the account identifier 42, and the check number 44 are inscribed in a particular font (E-13B) and typically printed with magnetic ink or toner that improves automated recognition, the combination of which is referred to in the art as magnetic ink character recognition (MICR). For convenience purposes, the check 24 includes a bank address block 46 that specifies the name and branch of the bank upon which the check 24 is drawn.

The rear face of the check 24 is best illustrated in FIG. 4b, which depicts an endorsement block 48 and a bank notation section 50. As indicated above, the endorsement block is used to indicate the payee's or the merchant's (14) acceptance of the check 24 to the merchant's bank 18. Additional stamps and markings may be made by the bank in its processing workflow. In addition, the rear face of the check 24 may include various security features that prevent counterfeiting.

The check scanner 28 is understood not to segment the captured data into various blocks described above. However, it is contemplated that the bank routing number 40 and the account identifier 42, which are inscribed as MICR data, may be read and recognized in addition to the captured raw image or raster data of the check 24. The MICR data may be appended to the image of the check 24, or may be transmitted separately. The data is then combined with additional information provided to the remote terminal 26 for transmission to a central payment processor 52, the details of which will be described more fully below.

Generally, the remote terminal 26 is a data processing apparatus for capturing, aggregating, and transmitting business transaction data to a remote system for completing payment. The remote terminal 26 includes a multifunction keypad 54, a screen 56 for displaying the results of the processed transactions and associated status messages, and a communications module 58. In addition to the foregoing, the remote terminal 26 may include a magnetic card/strip reader 36, as well as a printer 63 for reasons that will be described more fully below. By way of example only and not of limitation, the remote terminal 26 is an Omni Vx terminal from VeriFone, Inc. of San Jose, Calif., though any other suitable remote terminal device may be utilized. Depending upon the specific remote terminal 26, the above-described components may be internal thereto or connected to the terminal 26 as an external peripheral device.

In further detail, the communications module 58 may be any one of widely known data communications modalities. For example, it may be a modem device that establishes a modulated audio data communications link 60 to the central payment processor 52 over standard telephone lines. Alternatively, it may be an Ethernet interface that connects to the central payment processor 52 over the Internet or other high-speed data network. Other envisioned data communications modalities include cellular telephone links, WiFi links, and the like. According to some embodiments of the present invention, the check scanner 28 establishes an alternative, independent network connection to the central payment processor 52 for the transmission of check image data.

Figure 5:
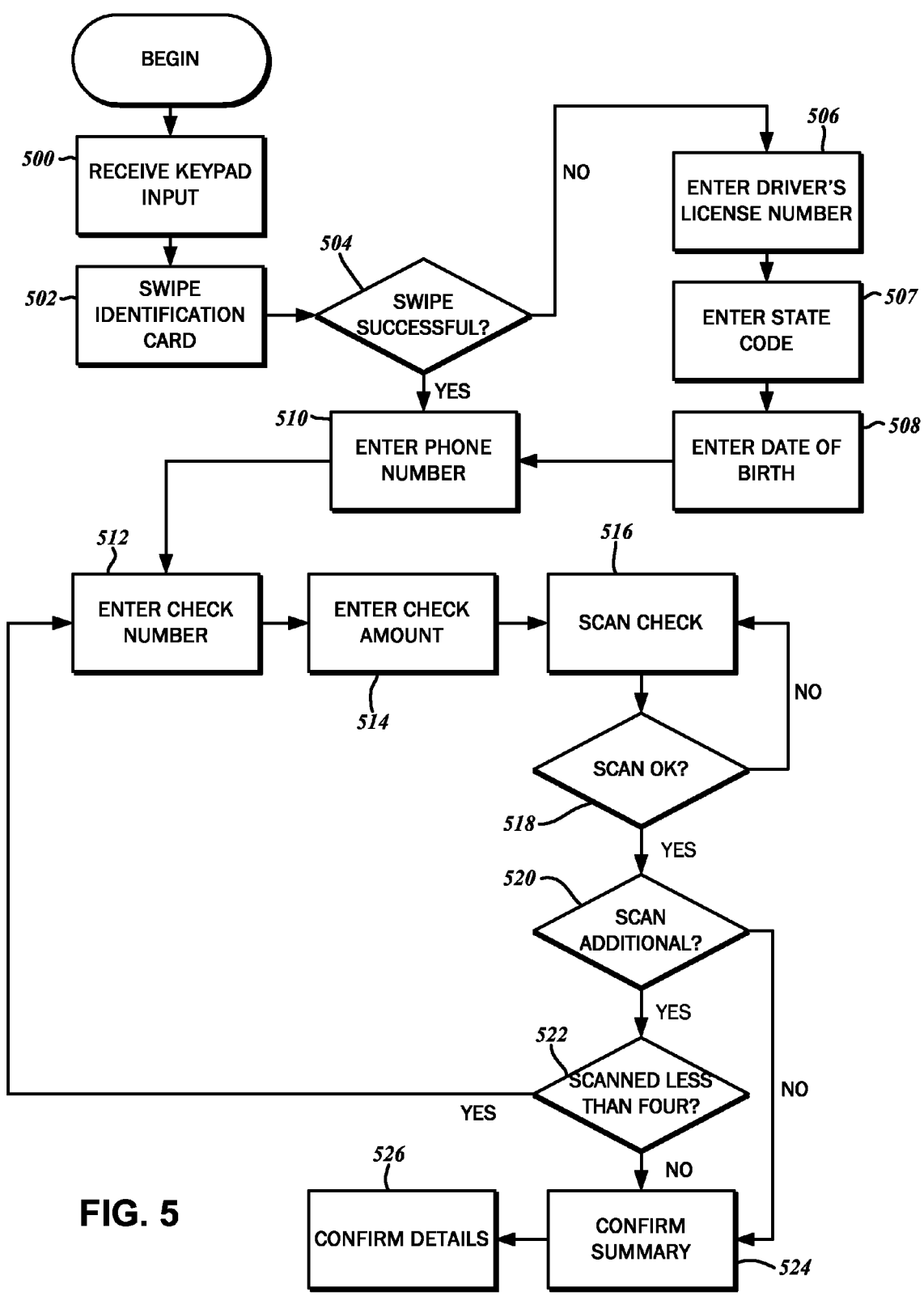
FIG. 5 is a flowchart of a terminal device software application implementing the electronic deferred check payment issuance system.

For the remote terminal 26 to perform the aforementioned capture, aggregation, and data transmission operations, it is contemplated that the remote terminal 26 is programmed with executable instructions therefor that coordinates the operation of the check scanner 28, the keypad 54, the screen 56, and the communications module 58. Further details of such executable instructions, and in particular those relating to the capture and transmission of the checks 24, are illustrated in the flowchart of FIG. 5. The method begins with a step 500 of receiving an input from the keypad 54 to initiate a deferred payment transaction. Thereafter, in step 502, an identification card of the purchaser 10 such as a driver's license or other government-issued credential with a magnetic encoding strip is scanned with a magnetic card reader 62. Typical information encoded in a magnetic strip of an identification card includes an identification number, date of birth, and the issuing State, among others. In the absence of a magnetic encoding strip, it is also contemplated that a barcode, if present on the identification card, may be scanned with a bar code reader to capture the same information. If it is determined in the decision block 504 that the read was not successful or that the presented identification card did not have a magnetic strip, the method continues with manual entry steps 506, 507, and 508, where the keypad 54 is used to enter the identification number, a code corresponding to the issuing State, and the date of birth, respectively. Otherwise, such data is read directly from the identification card. Preliminary data collection concludes with a step 510 of entering the phone number of the purchaser 10 via the keypad 54. Throughout each of these data collection steps, the screen 56 displays corresponding prompts therefor to request proper data from the user/merchant 14.

Next, in step 512 the check number 44 from the first of the plurality of checks to be scanned is entered via the keypad 54, and in step 512, the amount specified thereby is likewise entered via the keypad 54. Again, the screen 54 displays prompts corresponding to the respective data inputs. Then, the check scanner 28 is activated and the check 24 is fed for scanning in step 516. After scanning the front and back sides of the check 24, basic verifications are performed according to decision block 518 to ensure that the image data was properly captured. For example, if the check scanner 28 timed out before receiving any data, then an indicator would be activated to prompt a re-scan. Although the check number and check amount data entered into the remote terminal 26 via the keypad 54 corresponds to the scanned check images, the check images are understood to be stored independently in certain embodiments.

If there are additional checks 24 to be scanned as determined in decision block 520, the method returns to step 512 to continue proceeding as described above. The result of the decision block 520 may be determined based upon input from the user prompted to enter whether additional checks remain. As previously indicated, one preferred embodiment of the present invention contemplates a maximum limit of four checks 24 that can be presented for any given transaction, with the total not to exceed $1500. Therefore, before continuing with scanning a subsequent check, decision block 522 determines if the number of checks 24 scanned so far does not exceed such limit. Along these lines, in one preferred embodiment, it is contemplated that the first check presented is in an amount no less than one third of the total amount for the entire transactions, and the remaining checks are in equal amounts. For example, if the total transaction is $1500, then the first check must be at least $500, and the remaining checks are each $333.33. However, these limitations are presented by way of example only and not of limitation. Any other proportion in relation to the amount of the first check and the amount of the subsequent checks may be readily substituted without departing from the scope of the present invention. It is expressly contemplated that the dates on all of the checks 24 are the same.

All of the entered data is then verified in a check summary confirmation step 524 and a detail confirmation step 526. In one embodiment, the total of all the checks 24 presented as keyed into the remote terminal 26 in step 514 may confirmed. However, other related aggregate or summary data relating to the checks 24 may also be confirmed. Those having ordinary skill in the art will readily devise such alternative summary data. In the detail confirmation step 526, all or part of the entered data, such as the identification number, date of birth, issuing state, phone number, the check number for each of the scanned checks, and so forth may be verified.

The method then continues with a step 210 of evaluating an approval status for the transaction based upon the account identifier. Thus, instantaneous approval of the transaction is possible. Typically, the evaluation of the approval status may involve a simple request to the purchaser's bank 20 to determine whether there are sufficient funds in the purchaser's account. Additionally, the evaluation of the approval status may involve the querying of databases that list currently outstanding bad check writers such as SCAN and the like. However, more sophisticated modalities for assessing the risk of default are also deemed to be within the scope of the present invention, including the evaluation of credit reports and the like.

Another embodiment contemplates, however, an approval step based upon a manual verification of the purchaser 10 over a call to the central payment processor 52 before the acceptance of the checks. In further detail, the merchant 14 may initiate a voice telephone call to the central payment processor 52 with much of the same information needed for approval as noted above in relation to the other embodiment, and manually approve the transaction based upon the same criteria. At such time, an approval code may be recited verbally to the merchant 14.

Upon approval, the method continues with the transmission of the check images. Referring to the flowchart of FIG. 3, one embodiment of the present invention envisions a step 220 of transmitting the images of the checks 24 to the central payment processor 52 immediately after the receipt thereof. The check scanner 28 may independently store and transmit the image data, so it is understood that the remote terminal 26 generates instructions or commands to the check scanner 28 that initiate the transmission. Because the transaction has already been approved before transmitting the checks 24 to the central payment processor, it is not necessary to do so before the purchaser 12 accepts the goods or services. Instead, the images may be transmitted in a batch accumulated after a day of business. It will be appreciated that the batch transmission may proceed on any interval, such as every other day, weekly, biweekly, and so forth.

Along with the images of the checks 24, an image of a security agreement setting forth the various terms and obligations between the purchaser 12, the merchant 14, and the central payment processor 52 in accordance with the various embodiments of the present invention disclosed herein may be transmitted to the central payment processor 52. For example, account deduction terms where the merchant 14 agrees to deposit the checks 24 no later than two business days after the agreed upon deposit dates for payment of designated goods and services may be included. Additionally, the security agreement may specify various penalty terms in case the purchaser 10 has insufficient funds to cover any one of the checks 24 presented, as well as a guarantee by the central payment processor 52 to reimburse the merchant 14 in full were this to occur. The security agreement may also include miscellaneous terms such as choice of law provisions and severability provisions.

The verbally conveyed approval codes noted above may be provided by the merchant 14 in a check listing table 64 included in the security agreement. The check listing table 64 provides multiple columns, including a first column 66 for listing the check number 44 for each of the plurality of checks 24, a second column 68 for listing the amount, a third column 70 for listing the date, a fourth column 72 for the agreed-upon deposit date of each check, and a fifth column 74 for the approval codes. Upon the images of the security agreement being transmitted to the central payment processor 52, the approval codes may be validated against those previously noted during the approval call.

The security agreement may solicit additional information as shown in FIGS. 7a and 7b. More particularly, the form of FIG. 7a requests additional information regarding the purchaser, such as the name 76, street address 78, city 80, state 82, zip code 84, social security number 86, date of birth 88, home phone number 90, and work phone number 92. Additionally, work status information may be requested, such as employer business name 94 and number of years employed 96. The form of FIG. 7b identifies the merchant 14 by business name 98, the name of the salesperson 100 and his/her signature 102, and the purchaser's signature 104. Furthermore, the form includes the date 106 on which the security agreement was entered. It will be recognized by those having ordinary skill in the art, however, that the above description of the security agreement is presented by way of example only and not of limitation, and that any other information helpful for assessing the default risk of the purchaser 10 may be requested. After entering the transaction into the remote terminal 26, regardless of whether the image data of the checks 24 are transmitted immediately to the central payment processor 52 or batch transferred at a later time, a receipt 110 memorializing the transaction is produced for the purchaser 10 as well as the merchant 14.

As indicated above, the remote terminal includes an integrated printer 63 to produce the receipt 110. The printer 63 may be any one of many widely utilized types, including thermal transfer, impact, and inkjet printers. As best illustrated in FIG. 8, the receipt 110 includes all of the pertinent information previously entered, as well additional details pertaining to the merchant 14. The receipt 110 may be segregated into multiple blocks, including a merchant identifier block 112 setting forth the name and address of the merchant 14. Additionally, a time and date stamp 114 is included that details the time and date the transaction was entered. A transaction details block 116 includes a unique identification number of the remote terminal 26, the batch number of the transaction, and the routing number 40 and account number 42 of the checks 24 presented. An itemized check listing 118 includes a column for an item identification number, the amount and the check numbers 44 of the checks 24 presented, and the approval codes therefor. A total dollar amount for the entire transaction is also included. A notice block 120 highlights the most pertinent terms from the security agreement as another reminder of the same. Further information, such as advertising copy and the like, may be provided in a footer block 122. As indicated above, the receipt 110 is produced for both the purchaser 12 and the merchant 14, so each copy may be inscribed with a copy identifier 124. Although specifics of the receipt 110 have been described in detail, it will be appreciated by those having ordinary skill in the art that they are presented by way of example only and not of limitation. Any other suitable form and content of the receipt 110 may be substituted without departing from the scope of the present invention.

Once the checks 24 are tendered and submitted to the central payment processor 52, the method continues with the transfer of funds from the purchaser 10 to the merchant 14 according to the agreed-upon framework as set forth in one embodiment of the present invention. First, with reference to the flowchart of FIG. 3, the transfer of funds to the merchant 14 in step 230 will be considered. Referring again to the block diagram of FIG. 2, the central payment processor 52 is part of the check-clearing network 22, and is generally capable of transferring funds to and from the purchaser's bank 20 and the merchant's bank 18 over several well-known modalities discussed above, such as ACH and the Check 21 framework. Instead of directly transferring the funds from the purchaser's bank 20 to the merchant's bank 18, however, it is contemplated that the central payment processor 52 also maintains an account 108 with a financial institution that may be the same or as or different from the bank 18 and the bank 20, from which the funds to the merchant 14 are provided. Essentially, the account 108, also referenced herein as the processor account, serves an intermediary function. The central payment processor 52 originates an ACH credit request against the processor account 108 specifying the merchant's bank account 18 as the recipient, and payment is rendered.

In one embodiment of the present invention, the transfer of funds to the merchant's bank 18 occurs according to one of several predefined transfer schedules. One schedule contemplates a single, lump-sump payment at or around the time that the checks 24 are tendered and processed by the central payment processor 52. More particularly, it is envisioned that the transfer of funds to the merchant's bank account 18 be completed by the third business day following the approval of the entire transaction. To compensate the central payment processor 52 for services rendered thereby, the merchant 14 may be invoiced for a fee of, for example, 7.95% of the total transaction amount and a $0.20 service fee for each transaction. The fees are understood to accumulate for each transaction handled by the central payment processor 52 in accordance with the present invention, and the merchant 14 can be invoiced on a monthly basis. Alternatively, these fees may be deducted from the amount transferred to the merchant's bank 18. An initial setup fee of, for example, $95 may also be charged to the merchant 14 in addition to the foregoing fees. It will be appreciated by those having ordinary skill in the art that the foregoing percentages and may be variously adjusted upwards or downwards.

In another embodiment, the contemplated schedule involves the multiple transfer of checks at staggered times that correspond to when each of the checks 24 are presented for settlement from the purchaser's bank account 20. As will be described in further detail below, the checks 24 are presented in 30-day intervals, that is, at 0 days, 30 days, 60 days, and 90 days after the initial transaction, and the merchant 14 is credited within one business day thereof. It will be understood, however, that any other desirable interval may be selected. Along these lines, the transfer of funds to the merchant 14 is understood to be independent of the withdrawal of funds from the purchaser 10. With respect to fees, the merchant 14 can be invoiced a fee of, for example, 3.95% of the total transaction amount, and a $0.20 service fee on a monthly basis, or the amount can be deducted from the amount transferred to the merchant 14. As indicated above, the foregoing percentages and fees may be adjusted upwards or downwards.

The fees payable by the merchant 18 are different between the two above-described cases because of the costs of capital. Although the central payment processor 52 remains liable to the merchant 14 for the entirety of the transaction regardless of when a check settlement fails, the convenience of a lump-sum payment is contemplated to justify a premium over staggered settlement. Moreover, lump sum payments leave less working capital in the processor account 108 for the benefit of the central payment processor 52 for such purposes as earning interest, among others. Accordingly, the rates charged for the lump sum payment are higher than that of the deferred payment, though it can also be understood that a discount is given for accepting deferred payments because of the benefits to the central payment processor 52. In either case, the equal treatment of the merchant 14 and the central payment processor 52 is the intention. While specific rates and percentages have been disclosed, those having ordinary skill in the art will be able to devise alternative rates and arrangements based upon the considerations set forth in the present disclosure.

Figure 3:
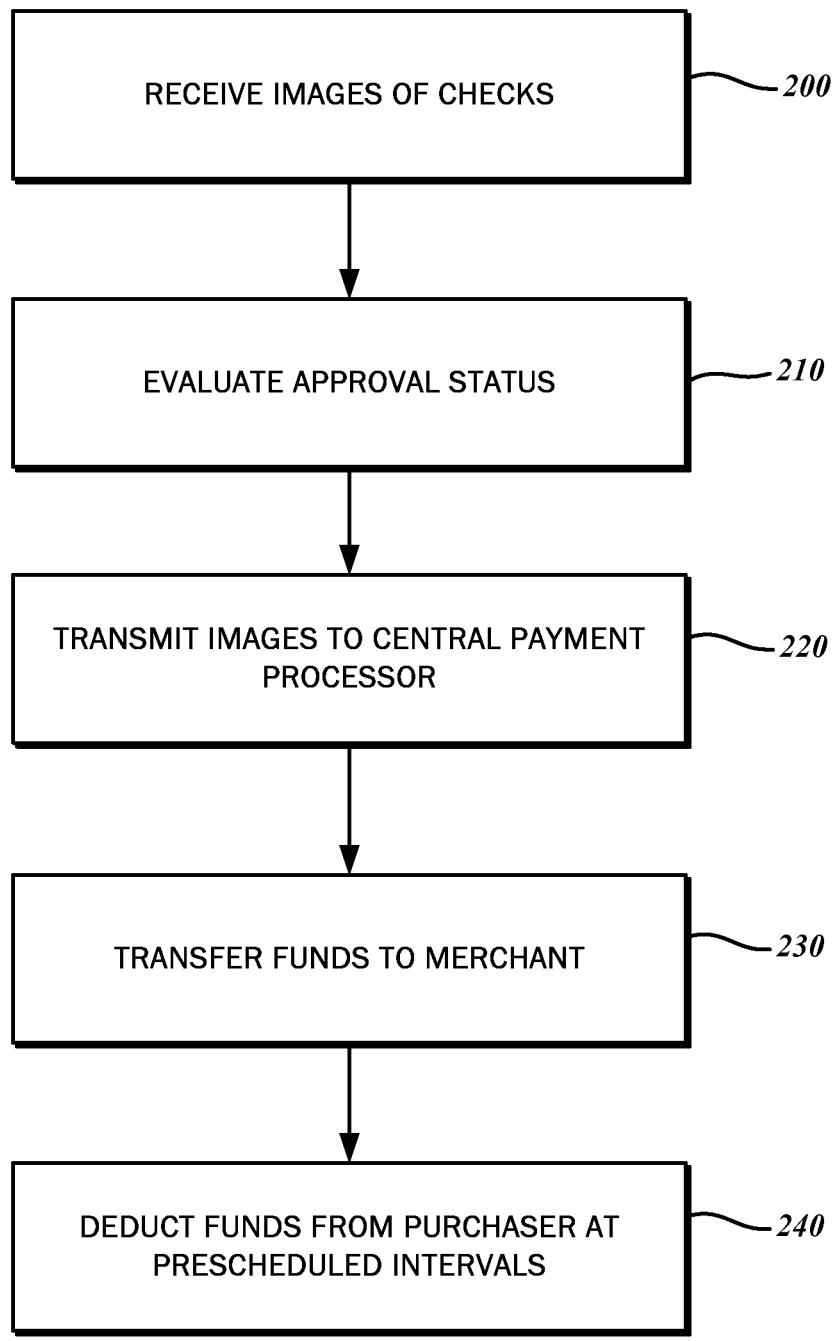
FIG. 3 is a is a flowchart illustrating steps of the method for processing finance payments.

Having considered the crediting the merchant's bank account above, the deduction of funds corresponding to the presented checks 24 according to an embodiment of the present invention will now be described, again with reference to the flowchart of FIG. 3. The method concludes with a step 240 of deducting funds from the purchaser's bank account 20 at prescheduled intervals. More specifically, an amount specified in the check 24 corresponding to that particular interval is deducted. As previously noted, a preferred embodiment of the present invention envisions a thirty-day interval between deductions. Continuing with the exemplary transaction described above, the first deduction thus occurs upon the initial payment of the $500 check, and at 30 days, 60 days, and 90 days, $333.33 is deducted from the purchaser's bank account 20. It will be recognized by those having ordinary skill in the art that variations in the account deduction schedules and check amount proportions may be different from those of the present example. That is, as indicated above, the proportion of the amount for the first one of the checks to the amount of the subsequent checks are not intended to be limiting.

In further detail, the images of the checks 24 received from the remote terminal 26 or the check scanner 28 as described above are stored at the central payment processor 52. At the specified 30-day intervals, the images of the checks 24 are transmitted as remote deposits under the Check 21 framework into the processor account 108, at which time the bank initiates a request with the purchaser's bank 20 for the transfer of the appropriate amount of funds therefrom. It is also contemplated that third party processors other than the banks may handle the transfers. As previously noted, it is possible for a copy of the check 24 to function as an ACH debit authorization by way of the security agreement. In this regard, the central payment processor 52 is understood to originate an ACH credit thereto that is to be deducted from the purchaser's bank account 20. The ACH credit is likewise originated at 30-day intervals according to the predefined schedule described previously. To the extent that any check 24 fails to clear, the central payment processor 52 is responsible therefor, as the reimbursement obligation to the merchant 14 remains. However, because the central payment processor 52 retains interest in the purchaser's repayment obligations, it may independently initiate a collection action against the purchaser 10 without involvement of the merchant 14.

Because the purchaser 10 only pays for the amount of the sale as any service charges or fees are paid for by the merchant 14 as part of its arrangement with the central payment processor 52, the purchaser 10 is effectively extended a 90-day "same as cash" financing alternative.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding thereof, the description taken with the drawings making apparent to those skilled in the art how the several forms of the present invention may be embodied in practice.

What is claimed is:

1. A method for processing finance payments from a purchaser to a merchant in a transaction, the method comprising the steps of:
   receiving on a merchant terminal device images of a plurality of present-dated financial instruments each including a monetary value and at least one identifier associated with a financial account of the purchaser;
   receiving an approval status for the transaction on the merchant terminal device, the approval status evaluation being based upon the account identifier on the images of the financial instruments;
   transferring to the merchant from a processor account funds corresponding to the total monetary value of each of the financial instruments upon acknowledgement of the approval status by a remote processing center computer system; and
   deducting funds from the financial account of the purchaser to credit the processor account at prescheduled intervals as set and initiated by the remote processing center computer system, an amount corresponding to the monetary value of a sequential one of the financial instruments being deducted at each interval;
   wherein the prescheduled intervals are independent of the dates on the financial instruments.

2. The method of claim 1, further comprising:
   invoicing the merchant for service charges based upon the total monetary value of each of the financial instruments.

3. The method of claim 1, further comprising:
   transmitting the images to the remote processing center computer system.

4. The method of claim 3, wherein the processor account is associated with the remote processing center.

5. The method of claim 1, wherein the step of deducting funds from the purchaser includes originating an automated clearing house (ACH) credit against the financial account of the purchaser.

6. The method of claim 1, wherein the step of deducting funds from the financial account of the purchaser includes transmitting the images of the financial instruments to an institution associated with the processor account for settlement.

7. The method of claim 1, wherein the step of transferring funds to the merchant includes originating an ACH credit thereto.

8. The method of claim 1, wherein the prescheduled intervals are at least 30 days apart.

9. A method for deferred check processing comprising the steps of:
   receiving from a merchant terminal at a processing center computer system a purchaser account identifier and a plurality of deferred payment amounts each on an image of corresponding present-dated financial instruments, the purchaser account identifier being correlated to a purchaser checking account;
   directing the transfer of the deferred payment amounts specified in the images of the financial instruments to a merchant account from the processing center computer system in accordance with one of a plurality of predefined merchant transfer schedules set and defined on the processing center computer system, each having a service charge associated therewith and invoiced to the merchant; and
   directing from the processing center computer system the deduction of funds from the purchaser checking account corresponding to the deferred payment amounts specified in the images of the financial instruments according to a predefined deduction schedule independent of the dates on the financial instruments and stored on the processing center computer system as specified via the merchant terminal.

10. The method of claim 9, further comprising:
    receiving images of a plurality of checks, each of the checks including a one of the deferred payment amounts and the purchaser account identifier.

11. The method of claim 9, wherein a first one of the plurality of selectable predefined merchant transfer schedules is the immediate transfer of the entirety of all of the deferred payment amounts to the merchant account.

12. The method of claim 11, wherein a second one of the plurality of predefined merchant transfer schedules is the delayed transfer of one or more of the deferred payment amounts at set intervals correlated to the predefined deduction schedule.

13. The method of claim 12, wherein the set intervals are at least 30 days apart.

14. The method of claim 12, wherein the service charge associated with the first one of the plurality of predefined merchant transfer schedules is higher than the service charge associated with the second one of the plurality of predefined merchant transfer schedules.

15. The method of claim 9, wherein the step of directing the deduction of funds from the purchaser checking account includes originating an ACH credit thereto.

16. The method of claim 9, wherein the step of directing the transfer of funds from the purchaser checking account includes transmitting the images of the checks for settlement to an entity selected from the group consisting of: a depositing financial institution, or a third party processor under authority of a depositing financial institution.

17. The method of claim 9, wherein the step of directing the transfer of funds to the merchant account includes originating an ACH credit thereto.

18. An electronic deferred check payment issuance system, comprising:
    a remote merchant terminal;
    a check image scanner connected to the remote merchant terminal for digitizing a plurality of checks as check images each being present dated and having an account identifier and a monetary value associated therewith, each of the checks being tendered as partial payment for a single transaction between a merchant and a purchaser; and
    a central payment processor in communication with the remote merchant terminal and a check clearing network to which a merchant account and a purchaser account designated by the account identifier on the check is connected, funds quantified by the monetary values read from the check images being deductible from the purchaser account and depositable to the merchant account by the central payment processor through the check clearing network in response to a submission of the check images thereto according to a set of a plurality of schedules defined by the central payment processor and independent of the dates of the checks.

19. The system of claim 18, wherein a first one of the set of schedules is a staggered delay of predetermined length between each deduction from the purchaser account, the deductions corresponding to a sequential one of the plurality of checks.

20. The system of claim 18, wherein a second one of the set of schedules is a staggered delay of predetermined length between each deposit into the merchant account, the deposits corresponding to a sequential one of the plurality of checks.

21. The system of claim 18, wherein a third one of the set of schedules is a single lump-sum deposit into the merchant account, the deposit corresponding to a total monetary value of the plurality of checks.

22. The method of claim 1, further comprising:

receiving on the merchant terminal device an image of a security agreement separate from the financial instruments and defining the prescheduled intervals at which the funds from the financial account of the purchaser are deducted; and transmitting the image of the security agreement to the remote processing center computer system;

wherein the approval status for the transaction is based upon the security agreement.

23. The method of claim 9, further comprising:

receiving from the merchant terminal an image of a security agreement separate from the financial instruments and defining the prescheduled intervals at which the funds from the financial account of the purchaser are deducted.

* * * * *

UNITED STATES PATENT AND TRADEMARK OFFICE
CERTIFICATE OF CORRECTION

| | | |
|---|---|---|
| PATENT NO. | : 8,725,634 B2 | Page 1 of 1 |
| APPLICATION NO. | : 12/368597 | |
| DATED | : May 13, 2014 | |
| INVENTOR(S) | : Linden J. Fellerman | |

It is certified that error appears in the above-identified patent and that said Letters Patent is hereby corrected as shown below:

In the Claims

In Claim 5 (column 13, line 52), the word "credit" was erroneously used instead of "debit". Claim 5 should read as follows:

5. The method of claim 1, wherein the step of deducting funds from the purchaser includes originating an automated clearing house (ACH) debit against the financial account of the purchaser.

Signed and Sealed this
Ninth Day of September, 2014

Michelle K. Lee
*Deputy Director of the United States Patent and Trademark Office*